United States Patent
Taniguchi et al.

(10) Patent No.: US 10,883,177 B2
(45) Date of Patent: Jan. 5, 2021

(54) PLATED FIBER-REINFORCED MEMBER AND PLATING METHOD FOR FIBER-REINFORCED MEMBER

(71) Applicant: MITSUBISHI HEAVY INDUSTRIES ENGINE & TURBOCHARGER, LTD., Sagamihara (JP)

(72) Inventors: Kana Taniguchi, Tokyo (JP); Ryoji Okabe, Tokyo (JP); Hideyuki Minai, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 16/086,974

(22) PCT Filed: Mar. 25, 2016

(86) PCT No.: PCT/JP2016/059674
§ 371 (c)(1),
(2) Date: Sep. 20, 2018

(87) PCT Pub. No.: WO2017/163408
PCT Pub. Date: Sep. 28, 2017

(65) Prior Publication Data
US 2019/0106791 A1    Apr. 11, 2019

(51) Int. Cl.
*C23C 18/22* (2006.01)
*C23C 18/32* (2006.01)
(Continued)

(52) U.S. Cl.
CPC .......... *C23C 18/22* (2013.01); *C23C 18/1635* (2013.01); *C23C 18/1641* (2013.01);
(Continued)

(58) Field of Classification Search
CPC ............ C23C 18/1851; C23C 18/1855; C23C 18/1872; C23C 18/1886; C23C 18/20;
(Continued)

(56) References Cited

U.S. PATENT DOCUMENTS 4,948,674 A * 8/1990 Herold .................... C03C 17/10
427/304
2008/0170943 A1  7/2008 Cairo et al.
(Continued)

FOREIGN PATENT DOCUMENTS

CN    101220818 A    7/2008
CN    104583573 A    4/2015
(Continued)

OTHER PUBLICATIONS

International Search Report (Form PCT/ISA/210), dated May 17, 2016, for International Applicaton No. PCT/JP2016/059674, with an English translation.
(Continued)

*Primary Examiner* — Dah-Wei D. Yuan
*Assistant Examiner* — Nga Leung V Law
(74) *Attorney, Agent, or Firm* — Birch, Stewart, Kolasch & Birch, LLP

(57) ABSTRACT

A plated plated fiber-reinforced member includes: a fiber-reinforced member formed of a composite fiber material in which multiple reinforcing fibers dispersed in a resin, some of the multiple reinforcing fibers being allowed so that portions thereof protruding from a surface of the resin; and an electroless-plated layer formed on the fiber-reinforced member to cover the surface of the resin and the portions of the reinforcing fibers protruded from the surface of the resin.

4 Claims, 8 Drawing Sheets

(51) Int. Cl.
*C23C 18/38* (2006.01)
*C23C 18/30* (2006.01)
*C23C 18/16* (2006.01)
*C23C 18/20* (2006.01)
*C23C 18/24* (2006.01)
*C08J 5/04* (2006.01)

(52) U.S. Cl.
CPC ...... *C23C 18/2013* (2013.01); *C23C 18/2046* (2013.01); *C23C 18/24* (2013.01); *C23C 18/30* (2013.01); *C23C 18/32* (2013.01); *C23C 18/38* (2013.01); *C08J 5/042* (2013.01)

(58) Field of Classification Search
CPC ............ C23C 18/2013; C23C 18/2046; C23C 18/2073; C23C 18/22; C23C 18/24; C23C 18/28; C23C 18/285; C23C 18/30; C23C 18/32; C23C 18/1641; C23C 18/38; C23C 18/1635
USPC ........... 427/97.9, 99.5, 304, 305, 306, 443.1
See application file for complete search history.

(56) References Cited

U.S. PATENT DOCUMENTS

| | | |
|---|---|---|
| 2010/0092751 A1 | 4/2010 | Englhart et al. |
| 2012/0064361 A1 | 3/2012 | Suwa et al. |
| 2015/0184612 A1 | 7/2015 | Takada et al. |

FOREIGN PATENT DOCUMENTS

| | | | |
|---|---|---|---|
| EP | 1 947 346 A1 | | 7/2008 |
| JP | 6-264250 A | | 9/1994 |
| JP | 06264250 A | * | 9/1994 |
| JP | 8-246164 A | | 9/1996 |
| JP | 9-59778 A | | 3/1997 |
| JP | 2009-52091 A | | 3/2009 |
| JP | 2009052091 A | * | 3/2009 |
| JP | 2012-82510 A | | 4/2012 |
| JP | 2014-58700 A | | 4/2014 |
| JP | 5535849 B2 | | 7/2014 |

OTHER PUBLICATIONS

Written Opinion of the International Searching Authority (Form PCT/ISA/237), dated May 17, 2016 for International Application No. PCT/JP2016/059674, with an English translation.

\* cited by examiner

PLATED FIBER-REINFORCED MEMBER AND PLATING METHOD FOR FIBER-REINFORCED MEMBER

TECHNICAL FIELD

The present invention relates to a plated fiber-reinforced member formed on a surface of the fiber-reinforced member and a plating method for a fiber-reinforced member.

BACKGROUND ART

In the related art, as a means for forming a metal layer on a surface of a member made of a resin serving as a non-conductive substance, an electroless plating method is used (refer to, for example, Patent Document 1).

In order to firmly adhere a plated layer formed through an electroless plating method to a base, it is necessary to previously roughen a surface of a substrate to which catalysts are applied.

For example, in a case where a Ni plated layer is formed on a surface of a member made of an ABS resin, the member is immersed in a heated chromic acid-sulfuric acid solution and the ABS resin is etched before applying the catalysts, thereby forming multiple fine irregularities in the surface of the member.

CITATION LIST

Patent Document

Patent Document 1: Japanese Unexamined Patent Application, First Publication No. H9-59778

SUMMARY OF INVENTION

Technical Problem

Incidentally, it is desirable that an impeller used for a rotary machine have a high strength and high heat resistance. For this reason, the impeller is preferably made of a composite fiber material which includes a matrix resin having a high strength and a high heat resistance and multiple carbon fibers dispersed in the matrix resin.

In a case where a resin such as the above-described ABS resin (a resin in which multiple fine irregularities can be formed) is added to a material of an impeller to sufficiently obtain the adhesiveness between the impeller serving as a fiber-reinforced member and an electroless-plated layer formed on a surface of the impeller using an electroless plating method (also including a pre-treatment) described in Patent Document 1, there is a concern that it will be difficult to secure sufficient strength and heat resistance of the impeller.

Also, where a resin is selected in view of securing sufficient strength and heat resistance of the impeller, it is difficult to mix a resin with a composite fiber material serving as a material of the impeller in accordance with a type of resin in some cases.

That is to say, it is difficult to sufficiently secure the adhesiveness between a fiber-reinforced member and an electroless-plated layer formed on a surface of the fiber-reinforced member in a state in which the strength and the heat resistance of the fiber-reinforced member are sufficiently secured using the method described in Patent Document 1.

Thus, the present invention provides a plated fiber-reinforced member and a plating method for a fiber-reinforced member in which the adhesiveness between a fiber-reinforced member and an electroless-plated layer formed on a surface of the fiber-reinforced member can be sufficiently secured in a state in which the strength and the heat resistance of the fiber-reinforced member is sufficiently secured.

Solution to Problem

A plated fiber-reinforced member according to a first aspect of the present invention includes: a fiber-reinforced member formed of a composite fiber material in which multiple reinforcing fibers are dispersed in a resin, wherein some of the multiple reinforcing fibers are allowed so that portions thereof protruding from a surface of the resin; and an electroless-plated layer formed on the fiber-reinforced member to cover the surface of the resin and the portions of the reinforcing fibers protruding from the surface of the resin.

According to the plated fiber-reinforced member associated with the first aspect of the present invention, since the plated fiber-reinforced member is provided with the electroless-plated layer which covers a portion of the reinforcing fibers protruding from the surface of the resin, it is possible to improve the adhesiveness between the fiber-reinforced member and the electroless-plated layer.

Thus, it is not necessary to form fine irregularities by etching an ABS resin as in the conventional prior art, thereby it is possible to use the resin which satisfies the strength and the heat resistance required for the fiber-reinforced member.

Therefore, it is possible to sufficiently secure the adhesiveness between the fiber-reinforced member and the electroless-plated layer formed on the surface of the fiber-reinforced member in a state in which the strength and the heat resistance of the fiber-reinforced member are sufficiently secured.

In a plated fiber-reinforced member according to a second aspect of the present invention, multiple recessed portions may be formed on the surface of the resin.

In this way, since the multiple recessed portions are formed on the surface of the resin, the multiple recessed portions can be filled with a material of the electroless-plated layer. Thus, since an anchor effect can be obtained, it is possible to improve the adhesiveness between the resin and the electroless-plated layer.

In a plated fiber-reinforced member according to a third aspect of the present invention, multiple fine irregularities may be formed on the surface of the resin.

In this way, since the multiple fine irregularities are formed on the surface of the resin, the multiple fine irregularities can be buried in the electroless-plated layer. Thus, it is possible to improve the anchor effect.

In a plated fiber-reinforced member according to a fourth aspect of the present invention, the plated fiber-reinforced member may be an impeller.

Generally, while the impeller suctions outdoor air, water droplets, acids, $NO_X$ (nitrogen oxides), $SO_X$ (sulfur oxides), and the like in the air are also suctioned. Moreover, if the suctioned water droplets collide with the impeller at a high speed, erosion wear may occur.

However, since the impeller is configured to include the fiber-reinforced member and the electroless-plated layer which covers the surface of the fiber-reinforced member as described above, the electroless-plated layer (a metal layer harder than the fiber-reinforced member) can prevent the fiber-reinforced member from occurring the erosion wear.

A plating method for a fiber-reinforced member according to a fifth aspect of the present invention includes: an etching step of etching a surface of a fiber-reinforced member formed of a composite fiber material in which multiple reinforcing fibers are dispersed in a resin using an etching solution to selectively-dissolve the resin, thereby exposing portions of some of multiple reinforcing fibers from a surface of the resin; a vibration step of vibrating the fiber-reinforced member, thereby removing the reinforcing fibers fully exposed from the etched resin from the resin; a catalyst adsorption step of adsorbing catalysts on a surface of the resin on which multiple recessed portions are formed and portions of some of the reinforcing fibers from the surface of the resin, wherein the multiple recessed portions are formed by the removal of the fiber-reinforced member through the etching step and the vibration step; and an electroless-plated layer formation step of forming an electroless-plated layer on a surface of the fiber-reinforced member using the catalysts as nuclei through an electroless plating method after the catalyst adsorption step.

According to the plating method for a fiber-reinforced member associated with the fifth aspect of the present invention, the portions of some of the multiple reinforcing fibers are exposed from the surface of the resin, and then the catalysts are attached on the exposed portions of the reinforcing fibers and the surface of the fiber-reinforced member on which the multiple recessed portions are formed. Subsequently, the electroless-plated layer is formed on the surface of the fiber-reinforced member so as to cover the exposed portions of the reinforcing fibers. Thus, it is possible to improve the adhesiveness between the fiber-reinforced member and the electroless-plated layer.

Also, since the electroless-plated layer is formed through the above-described method, the multiple recessed portions are filled with the material of the electroless-plated layer. Therefore, it is possible to obtain an anchor effect. Thus, since it is not necessary to etch an ABS resin to form multiple fine irregularities on the fiber-reinforced member, it is possible to use the resin which satisfies the strength and the heat resistance required for the fiber-reinforced member.

That is to say, it is possible to sufficiently secure the adhesiveness between the fiber-reinforced member and the electroless-plated layer along with the strength and the heat resistance of the fiber-reinforced member are sufficiently secured.

Also, in a plating method for a fiber-reinforced member according to a sixth aspect of the present invention, the etching step and the vibration step may be performed at the same time.

In this way, since the etching step and the vibration step are performed at the same time, it is possible to efficiently remove the reinforcing fibers which are fully exposed from the etched resin from the resin.

Also, a plating method for a fiber-reinforced member according to a seventh aspect of the present invention may include: a roughening step of roughening the surface of the resin prior to the catalyst adsorption step, wherein the roughening step is performed before or after the etching step.

Even though irregularities can be formed in an area of the fiber-reinforced member in which the reinforcing fibers are exposed to a large extent through an etching process, it is difficult to form the irregularities in another area of the fiber-reinforced member in which the reinforcing fibers are exposed to a small extent through an etching process.

However, the above-described roughening step (for example, blast treatment) is performed, it is possible to form the multiple fine irregularities even in the area of the fiber-reinforced member in which the reinforcing fibers are exposed to a small extent.

That is to say, by performing the roughening step, it is possible to form the multiple fine irregularities even in the area of the fiber-reinforced member in which the reinforcing fibers are exposed to a small extent. Thus, it is possible to improve the above-described anchor effect.

Also, in a plating method for a fiber-reinforced member according to an eighth aspect of the present invention, a surface roughness Ra of the resin after the roughening step may be 3 μm or more and 8 μm or less.

If the surface roughness Ra of the resin after the roughening step is less than 3 μm, there is a concern that the adhesiveness between the surface of the resin and the electroless-plated layer will deteriorate.

On the other hand, if the surface roughness Ra of the resin after the roughening step exceeds 8 μm, there is a concern that it will be difficult to manage the thickness of the electroless-plated layer due to the large shape of the multiple fine irregularities formed in the surface of the resin.

Therefore, the surface roughness Ra of the resin is set in a range of 3 to 8 μm, it is possible to sufficiently secure the adhesiveness between the resin and the electroless-plated layer along with the thickness of the electroless-plated layer is easily managed.

Advantageous Effects of Invention

According to the present invention, it is possible to sufficiently secure the adhesiveness between a fiber-reinforced member and an electroless-plated layer formed on a surface of the fiber-reinforced member in a state in which the strength and the heat resistance of a fiber-reinforced member are sufficiently secured.

DESCRIPTION OF EMBODIMENTS

Embodiments to which the present invention is applied will be described in detail below with reference with the drawings. Note that the drawings used in the following description are for the purpose of explaining constitutions of the embodiments of the present invention and the size, thickness, dimension, and the like of each illustrated constituent element are different from an actual dimensional relationship between the fiber-reinforced member and the plated fiber-reinforced member in some cases.

First Embodiment

Figure 1:
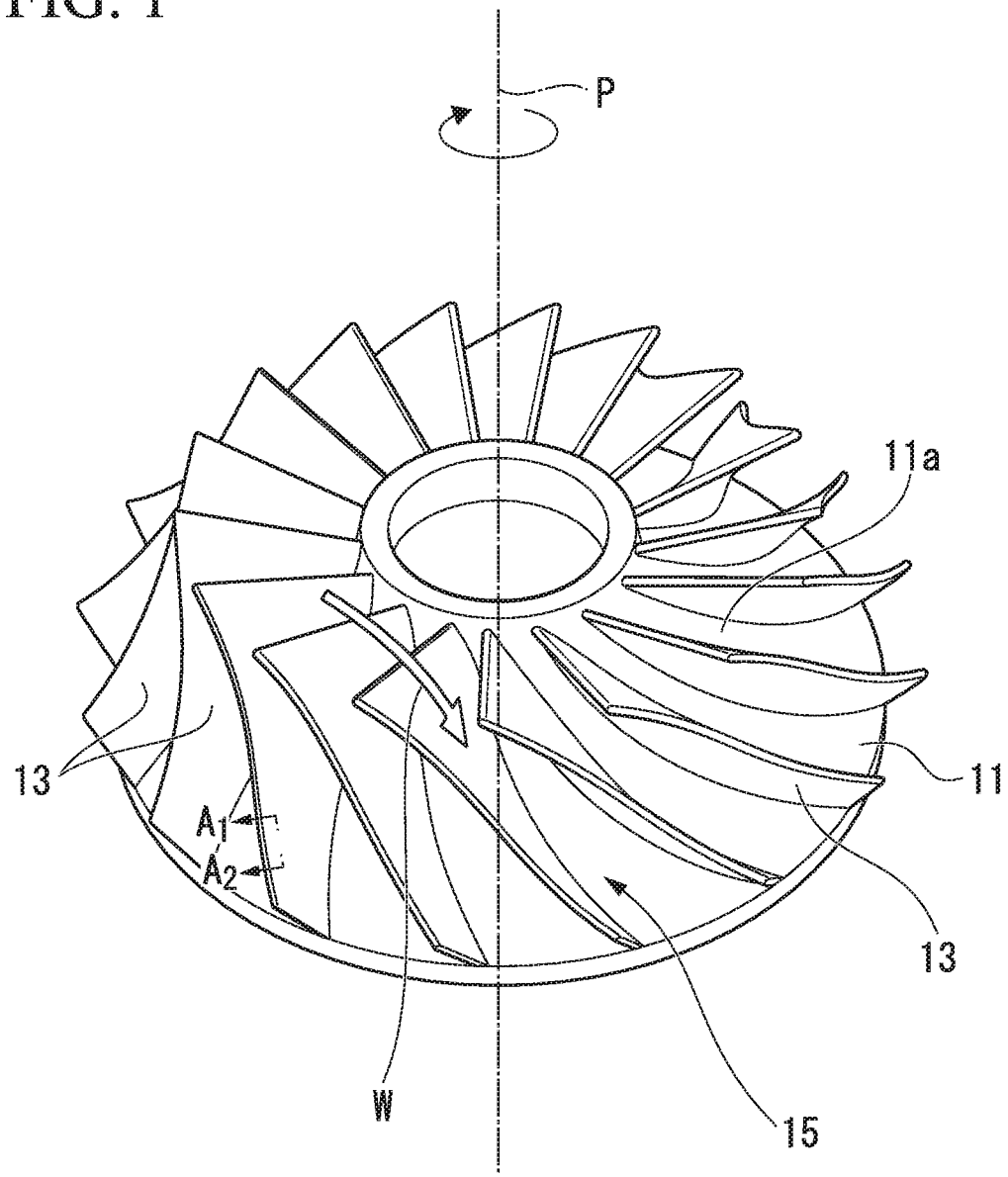
FIG. 1 is a perspective view showing an impeller serving as an example of a plated fiber-reinforced member according to a first embodiment of the present invention.

FIG. 1 is a perspective view showing an impeller serving as an example of a plated fiber-reinforced member according to a first embodiment of the present invention. FIG. 1 illustrates the impeller as an example of a plated fiber-reinforced member 10.

In FIG. 1, P represents a rotating shaft (hereinafter referred to as a "rotating shaft P") in the plated fiber-reinforced member 10 (the impeller in the case of the first embodiment) and W represents a coolant (hereinafter referred to as a "coolant W").

Figure 2:
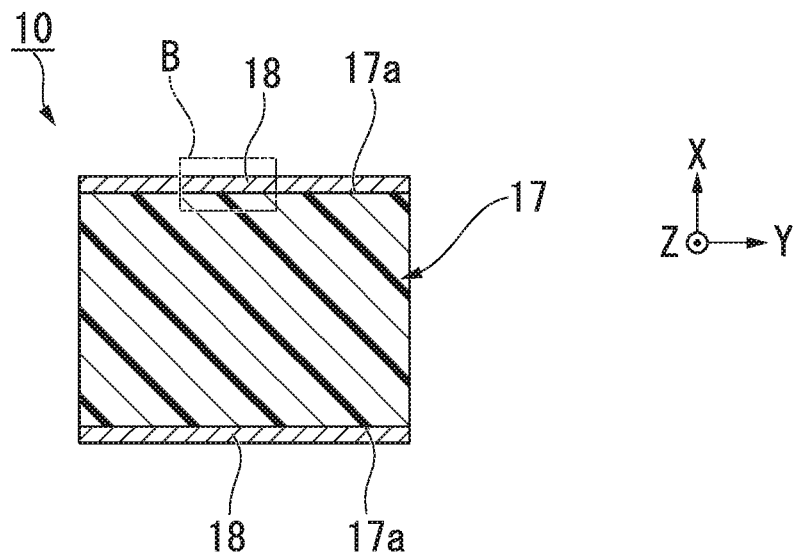
FIG. 2 is a cross-sectional view taken along line $A_1$-$A_2$ of the plated fiber-reinforced member illustrated in FIG. 1.

FIG. 2 is a cross-sectional view taken along line $A_1$-$A_2$ of the plated fiber-reinforced member illustrated in FIG. 1. In FIG. 2, constituent elements that are the same as those of the structure illustrated in FIG. 1 will be denoted by the same reference numerals. In FIG. 2, an X direction indicates a thickness direction of a blade 21, a Z direction indicates a depth direction of the paper surface orthogonal to the X direction, and a Y direction indicates a direction orthogonal to the X direction and the Z direction.

Figure 3:
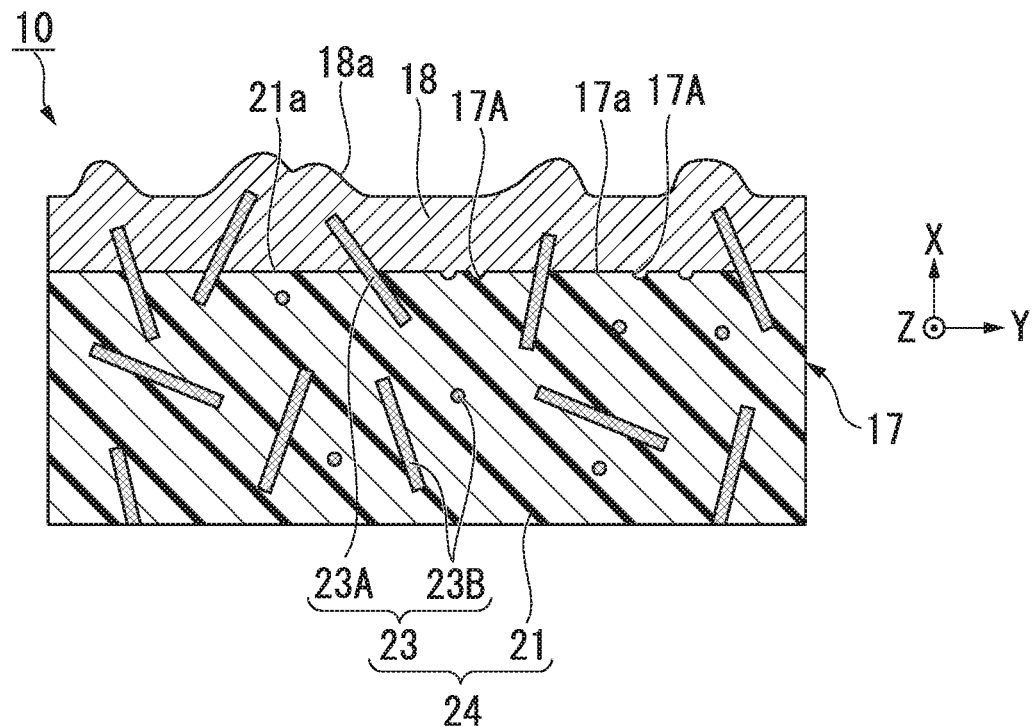
FIG. 3 is a cross-sectional view of a portion of the plated fiber-reinforced member illustrated in FIG. 2 surrounded by a region B.

FIG. 3 is a cross-sectional view of a portion of the plated fiber-reinforced member illustrated in FIG. 2 surrounded by a region B. In FIG. 3, constituent elements that are the same as those of the structure illustrated in FIGS. 1 and 2 will be denoted by the same reference numerals.

Referring to FIGS. 1 to 3, the plated fiber-reinforced member 10 (impeller) according to the first embodiment includes a disk 11, multiple (for example, 17 in the case of FIG. 1) blades 13, and multiple flow paths 15.

Also, the plated fiber-reinforced member 10 includes a composite fiber material 24 and is constituted of a fiber-reinforced member 17 corresponding to the shape of the disk 11 and the multiple blades 13 and an electroless-plated layer 18.

In the state illustrated in FIG. 1, the disk 11 has a curved surface whose diameter gradually increases from an inner side to an outer side in a radial direction of the rotating shaft P as an upper surface 11a into which the coolant W flows goes from an upstream side toward a downstream side of a flow of the coolant W.

The multiple blades 13 have a blade shape and the upper surface 11a which is a curved surface is provided to be erected. The multiple blades 13 are disposed at predetermined intervals in a rotational direction of the rotating shaft P.

Each of the flow paths 15 is a space formed between the blades 13 disposed adjacent to each other. The coolant W flows from an upstream side to a downstream side of the flow path 15.

The composite fiber material 24 is a material having multiple reinforcing fibers 23 dispersed in the resin 21. The resin 21 is a matrix resin and has a portion of a surface side thereof removed by etching. That is to say, the surface 21a of the resin 21 is an etched surface. The surface 21a of the resin 21 is a surface having the electroless-plated layer 18 formed thereon.

Multiple recessed portions 17A are formed on the surface 21a of the resin 21. The multiple recessed portions 17A are recesses formed by the removal of the reinforcing fibers 23 (the reinforcing fibers 23C illustrated in FIG. 6 which will be described later) accommodated in the resin 21 through the above-described etching.

In this way, since the surface 21a of the resin 21 to be applied the electroless-plated layer 18 has the multiple recessed portions 17A, it is possible to form the electroless-plated layer 18 to fill the multiple recessed portions 17A with a material of the electroless-plated layer. Thus, it is possible to sufficiently secure the adhesiveness between the fiber-reinforced member 17 and the electroless-plated layer 18 formed on the surface 21a of the resin 21.

Examples of the matrix resin include thermosetting resins (carbon fiber reinforced plastics with thermosetting resin matrix; CFRTS), thermoplastic resins (carbon fiber reinforced thermoplastics; CFRTP), and the like.

Examples of thermosetting resins includes unsaturated polyester resins, epoxy resins, vinyl ester resins, bismaleimide resins, phenolic resins, cyano resins, polyimide resins, and the like.

Examples of thermoplastic resins include nylon (polyamide; PA) resins, polypropylene (PP) resins, polyphenylene sulfide (PPS) resins, polyetherimide (PEI) resins, polycarbonate (PC) resins, polyetherketone (PEK) resins, polyether etherketone (PEEK) resins, polyether ketone ketone (PEKK) resins, polyimide (PI) resins, polyethersulfone (PES) resins, and the like.

The multiple reinforcing fibers 23 are disposed on the surface 21a side of the resin 21 and are constituted of the reinforcing fibers 23B which are fully covered with the resin 21 and the reinforcing fibers 23A having a portion protruding from the surface 21a (a portion of the reinforcing fibers).

The reinforcing fibers 23A extend in different directions. The electroless-plated layer 18 is formed on a portion of the reinforcing fibers 23A exposed from the surface 21a of the resin 21. Since the remaining portion of the reinforcing fibers 23A is disposed in the resin 21, the reinforcing fibers 23A are supported by the resin 21.

The reinforcing fibers 23B extend in different directions as in the reinforcing fibers 23A. Since the reinforcing fibers 23B are fully covered with the resin 21, an electroless-plated layer 19 is not formed. Since the reinforcing fibers 23B are provided in the resin 21, the reinforcing fibers 23B have a function of increasing the strength of the fiber-reinforced member 17.

Examples of the reinforcing fibers 23 include carbon fibers, glass fibers, quartz (quartz glass) fibers, and the like.

Examples of the composite fiber material 24 include carbon fiber reinforced plastics (CFRPs), glass fiber reinforced plastics (GFRPs), quartz fiber reinforced plastics (QFRPs), and the like.

For example, when CFRP is used as the composite fiber material 24, carbon fibers having a diameter of 5 to 10 μm and a length of 50 μm to 5 mm can be used as carbon fibers serving as the reinforcing fibers 23.

Also, for example, when multiple carbon fibers are blended with a polyamide resin serving as the resin 21, a blending proportion of a carbon fiber can be, 10 to 40 wt % if the composite fiber material 24 is 100 wt %.

The electroless-plated layer 18 is provided to cover a surface 17*a* of the fiber-reinforced member 17 including the surface 21*a* of the resin 21 and the surfaces of the reinforcing fibers 23 protruding from the surface 21*a*.

The electroless-plated layer 18 is formed by adsorbing catalysts on the surface 17*a* of the fiber-reinforced member 17 and performing precipitating and growing using the catalysts as nuclei. For this reason, growing is performed using catalysts adsorbed on the surface 21*a* of the resin 21 as well as catalysts adsorbed on the surfaces of the reinforcing fibers 23A protruding from the surface 21*a* as nuclei. Thus, a surface 18*a* of the electroless-plated layer 18 is an uneven surface having multiple irregularities.

In this way, when the surface 18*a* of the electroless-plated layer 18 is ceramically coated, since the surface 18*a* of the electroless-plated layer 18 is formed as the uneven surface, it is possible to improve the adhesiveness between the electroless-plated layer 18 and a ceramic layer (not shown) due to an anchor effect.

in a case where the impeller is used as the plated fiber-reinforced member 10, sufficient adhesiveness is obtained with the electroless-plated layer 18 alone. In this case, a thickness of the electroless-plated layer 18 can be, for example, 5 to 30 μm.

The electroless-plated layer 18 has an advantage that it can be formed with a uniform thickness with a high hardness as compared with an electrolytic plated layer. Furthermore, an electroless plating method has an advantage of being able to easily plate large parts.

Examples of the electroless-plated layer 18 include an electroless Ni—P plated layer (chemical composition; Ni: 90 to 96%, P: 4 to 10%), an electroless Cu plated layer, and the like.

According to the plated fiber-reinforced member 10 in the first embodiment, the plated fiber-reinforced member 10 includes the fiber-reinforced member 17 which is obtained from the composite fiber material 24 having the multiple reinforcing fibers 23 dispersed in the resin 21 and in which a portion of some reinforcing fibers 23A of the multiple reinforcing fibers 23 protrudes from the surface 21*a* of the resin 21 and the electroless-plated layer 18 provided to cover the surface 21*a* of the resin 21 and the portion of the reinforcing fibers 23A protruding from the surface 21*a*. Therefore, it is possible to improve the adhesiveness between the fiber-reinforced member 17 and the electroless-plated layer 18 by the electroless-plated layer 18 which covers a portion of the reinforcing fibers 23A protruding from the surface 21*a*.

Thus, since it is not necessary to form fine irregularities by etching an ABS resin as in the related art, it is possible to use a resin 21 which satisfies the strength and the heat resistance required for the fiber-reinforced member 17.

Therefore, it is possible to sufficiently secure the adhesiveness between the fiber-reinforced member 17 and the electroless-plated layer 18 formed on the surface 17*a* of the fiber-reinforced member 17 in a state in which the strength and the heat resistance of the fiber-reinforced member 17 are sufficiently secured.

Also, since the multiple recessed portions 17A are formed on the surface 21*a* of the resin 21, the multiple recessed portions 17A can be filled with the material of the electroless-plated layer 18. Thus, the anchor effect can be obtained. Therefore, it is possible to further increase the adhesiveness between the fiber-reinforced member 17 and the electroless-plated layer 18.

Generally, while the impeller suctions outdoor air, water droplets, acids, $NO_X$ (nitrogen oxides), $SO_X$ (sulfur oxides), and the like in the air are also suctioned. Moreover, if the suctioned water droplets collide with the impeller at a high speed, erosion wear may occur.

However, since the impeller is configured to include the fiber-reinforced member 17 and the electroless-plated layer 18 which covers the surface 17*a* of the fiber-reinforced member 17 as described above, the electroless-plated layer 18 (a metal layer harder than the fiber-reinforced member 17) can prevent the fiber-reinforced member 17 from occurring the erosion wear.

Figure 4:
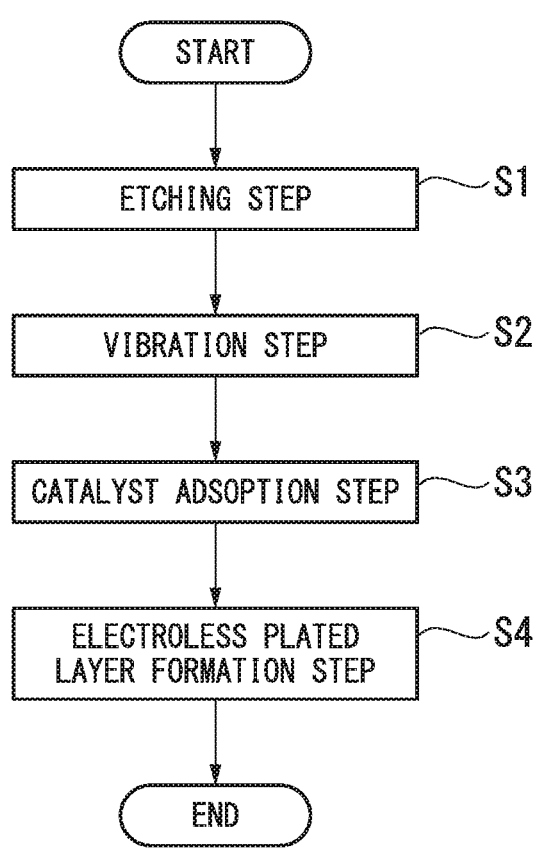
FIG. 4 is a flowchart for explaining a plating method for the plated fiber-reinforced member (including a plating pre-treatment) in the first embodiment.

FIG. 4 is a flowchart for explaining a plating method for the plated fiber-reinforced member (including a plating pre-treatment) in the first embodiment.

FIGS. 5 to 9 are cross-sectional views for explaining a plating pre-treatment and a plating treatment for the plated fiber-reinforced member in the first embodiment. In FIGS. 4 to 9, constituent elements that are the same as those of the plated fiber-reinforced member 10 according to the first embodiment will be denoted by the same reference numerals.

Figure 6:
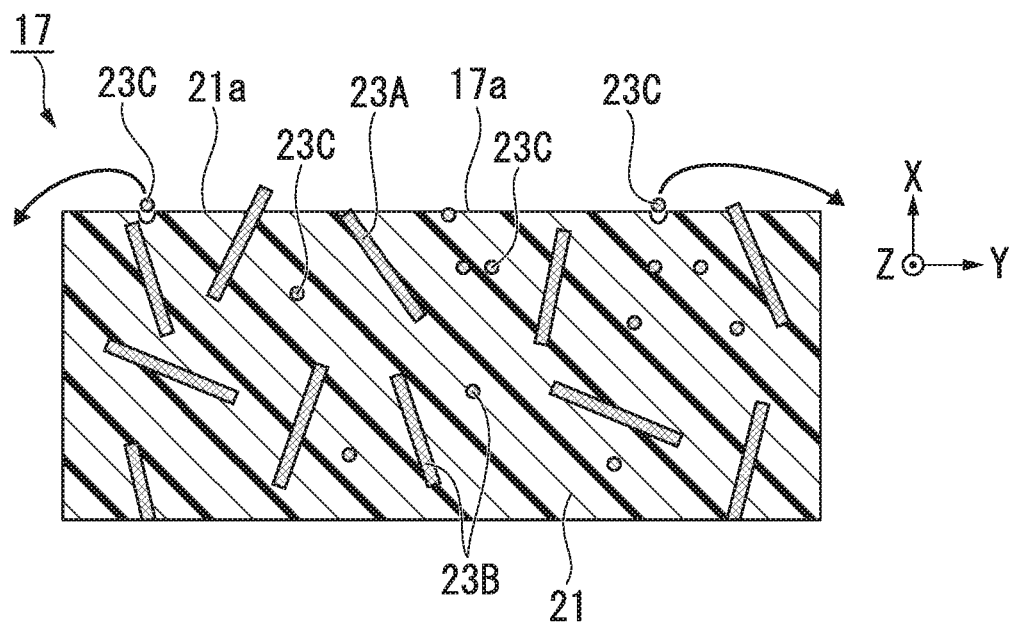
FIG. 6 is a cross-sectional view for explaining a plating pre-treatment and a plating treatment for the plated fiber-reinforced member (second view) in the first embodiment.
Figure 7:
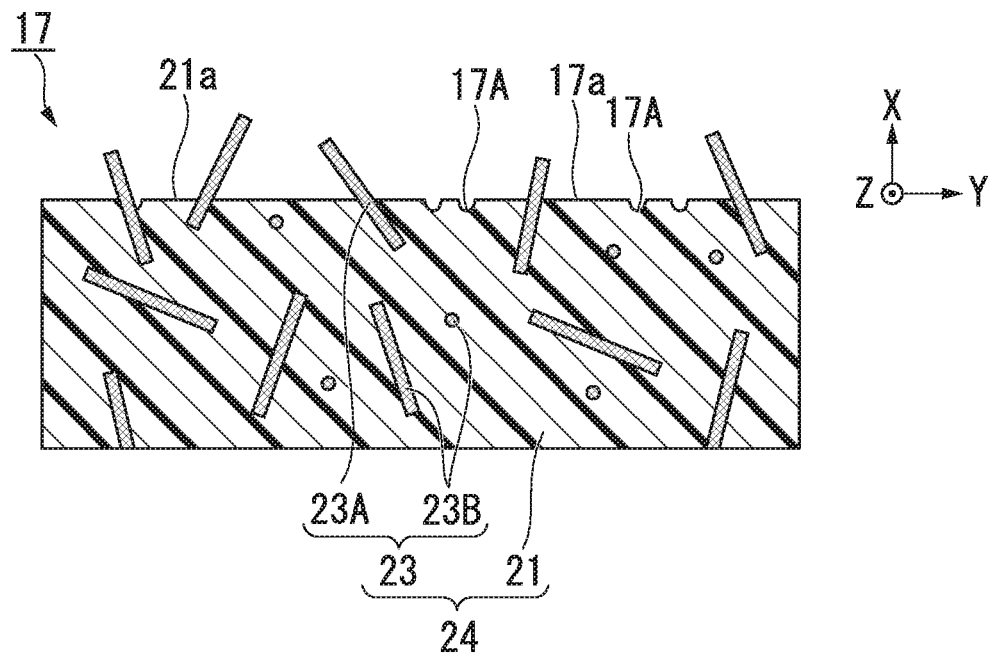
FIG. 7 is a cross-sectional view for explaining a plating pre-treatment and a plating treatment for the plated fiber-reinforced member (third view) in the first embodiment.

FIG. 6 schematically illustrates a state during an etching process. FIG. 7 schematically shows the fiber-reinforced member 17 after the etching step is completed.

The plating method (including the plating pre-treatment) for the plated fiber-reinforced member 10 according to the first embodiment will be described below with reference to FIGS. 4 to 9.

Figure 5:
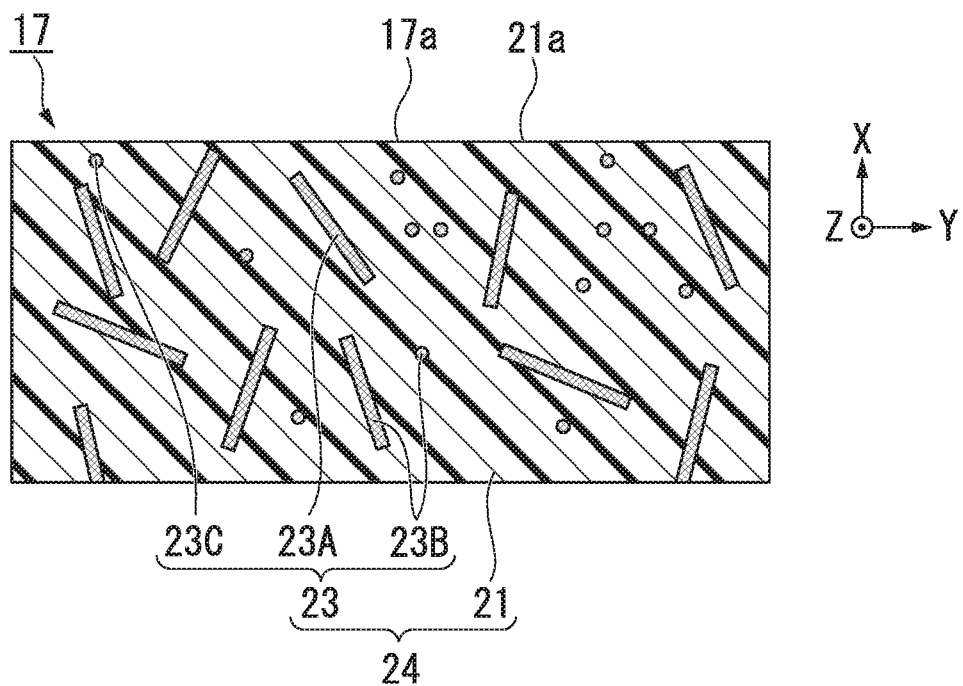
FIG. 5 is a cross-sectional view for explaining a plating pre-treatment and a plating treatment for the plated fiber-reinforced member (first view) in the first embodiment.

Before the process of FIG. 4 is started, the fiber-reinforced member 17 which is not etched is prepared using a known technique as illustrated in FIG. 5. At this stage, the reinforcing fibers 23A do not protrude from the surface 17*a* of the fiber-reinforced member 17. Furthermore, at this stage, the reinforcing fibers 23C to be removed from the resin 21 are also included in the multiple reinforcing fibers 23.

Subsequently, when the process illustrated in FIG. 4 is started, in S1, as illustrated in FIG. 6, the surface 17*a* of the fiber-reinforced member 17 illustrated in FIG. 5 is etched (etching step).

To be specific, the surface 17*a* of the fiber-reinforced member 17 including the composite fiber material 24 having the multiple reinforcing fibers 23 dispersed in the resin 21 is etched using an etching solution configured to selectively dissolve the resin 21. When the resin 21 is a polyamide resin, examples of the etching solution include a mixed acid solution of chromic acid and sulfuric acid and the like.

As illustrated in FIG. 6, while progressing the etching, the entire reinforcing fibers 23C disposed near the surface 17*a* of the fiber-reinforced member 17 which is not etched are exposed and the reinforcing fibers 23C are removed from the resin 21.

Moreover, as illustrated in FIG. 6, the multiple recessed portions 17A corresponding to a shape of the reinforcing fibers 23C are formed on the surface 21*a* of the resin 21 from which the reinforcing fibers 23C are removed.

In addition, when the resin 21 is etched up to an amount of etching serving as a target, a portion of the multiple reinforcing fibers 23A is exposed from the resin 21, the remaining portion of the reinforcing fibers 23C is removed from the resin 21, and the multiple recessed portions 17A are newly formed as illustrated in FIG. 7.

The above-described amount of etching serving as a target also depends on the diameter and the length of the reinforcing fibers 23 blended with the resin 21. However, for example, it is possible to appropriately select the amount of etching within a range of 5 to 30 μm. Furthermore, in the above-described etching step, an etching time is calculated on the basis of an etching rate of the resin 21 and the amount of etching serving as a target.

Subsequently, in S2 illustrated in FIG. 4, since the fiber-reinforced member 17 illustrated in FIG. 7 after the etching step is vibrated, a portion of the multiple reinforcing fibers 23A is fully exposed from the resin 21 and the reinforcing fibers 23C remaining on the surface 21a of the resin 21 are removed (vibration step)

It should be noted that a case in which the etching step and the vibration step are separately performed has been exemplified as an example in FIG. 4, but the etching step and the vibration step may be performed at the same time.

In this way, since the etching step and the vibration step are performed at the same time, it is possible to efficiently remove the reinforcing fibers 23C which are fully exposed from the etched resin 21 from the resin 21.

The vibration for the fiber-reinforced member 17 can be performed by, for example, ultrasonic waves, agitation for an etching solution, jetting of an etching solution, and the like.

Figure 8:
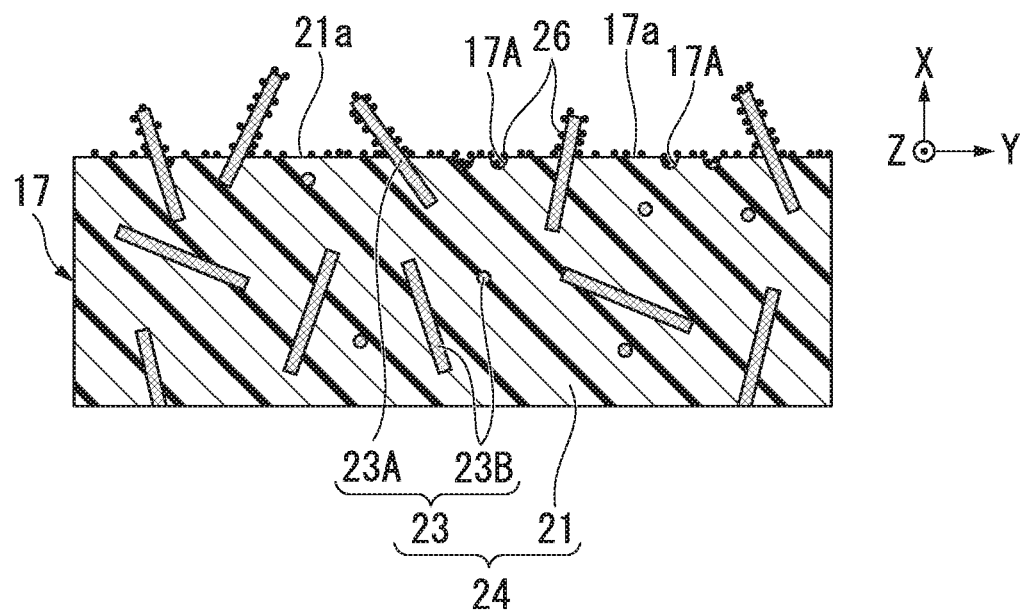
FIG. 8 is a cross-sectional view for explaining a plating pre-treatment and a plating treatment for the plated fiber-reinforced member (fourth view) in the first embodiment.

Subsequently, in S3 illustrated in FIG. 4, as illustrated in FIG. 8, catalysts 26 are adsorbed on the surface 21a of the resin 21 including the multiple recessed portions 17A and surfaces of portions of the reinforcing fibers 23A exposed from the resin 21 through a known method (catalyst adsorption step).

To be specific, in a case where an electroless Ni—P plated layer is formed as the electroless-plated layer 18 illustrated in FIG. 3, examples of the catalysts include paradium.

Figure 9:
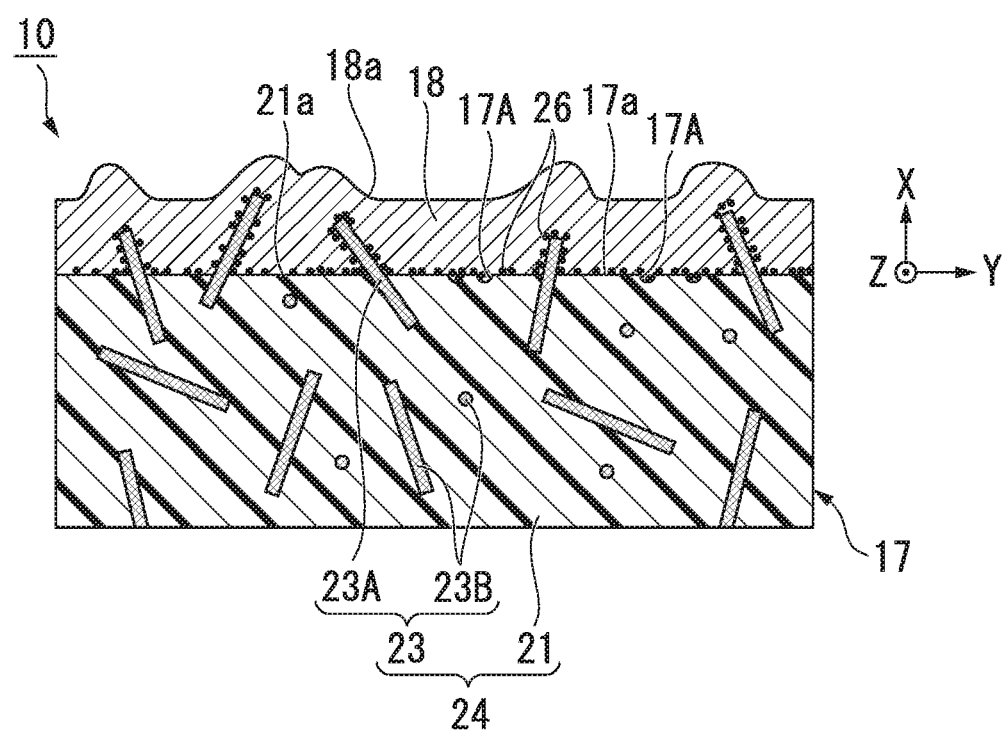
FIG. 9 is a cross-sectional view for explaining a plating pre-treatment and a plating treatment for the plated fiber-reinforced member (fifth view) in the first embodiment.

Subsequently, in S4 illustrated in FIG. 4, as illustrated in FIG. 9, the electroless-plated layer 18 is formed on the surfaces of the fiber-reinforced member (specifically, the surface 21a of the resin 21 and the surfaces of the portions of the reinforcing fibers 23A exposed from the resin 21) using the catalysts 26 as nuclei through a known electroless plating method (electroless-plated layer formation step).

Thus, the plated fiber-reinforced member 10 illustrated in FIG. 1 is manufactured and the process illustrated in FIG. 4 is completed.

While forming the electroless-plated layer 18, the catalysts 26 are applied on the surface 21a of the resin 21 and the surfaces of the portions of the reinforcing fibers 23A exposed from the resin 21. Thus, the precipitation of the electroless-plated layer 18 is simultaneously started on the surface 21a of the resin 21 and the surfaces of the reinforcing fibers 23A.

For this reason, a portion of the reinforcing fibers 23A exposed from the resin 21 is pushed up to the electroless-plated layer 18 and an inclined angle of a portion of the reinforcing fibers 23A with respect to the surface 21a of the resin 21 increases. Furthermore, since the electroless-plated layer 18 is formed along a portion of the reinforcing fibers 23A, multiple irregularities are formed in the surface 18a of the electroless-plated layer 18.

As the electroless-plated layer 18, for example, an electroless Ni—P plated layer, electroless Cu plated layer, and the like can be exemplified.

Furthermore, when the impeller is used as the plated fiber-reinforced member 10 illustrated in FIG. 1, a thickness of the electroless-plated layer 18 can be, for example, within a range of 5 to 20 μm.

According to the plating method for the fiber-reinforced member in the first embodiment, the portions of some of the multiple reinforcing fibers 23A are exposed from the surface 21a of the resin 21, and then the catalysts 26 are attached on the exposed portions of the reinforcing fibers 23A and the surface 17a of the fiber-reinforced member 17 on which the multiple recessed portions 17A are formed. Subsequently, the electroless-plated layer 18 is formed on the surface 17a of the fiber-reinforced member 17 so as to cover the exposed portions of the reinforcing fibers 23A. Thus, it is possible to improve the adhesiveness between the fiber-reinforced member 17 and the electroless-plated layer 18.

Also, since the electroless-plated layer 18 is formed through the above-described method, the multiple recessed portions 17A are filled with the material of the electroless-plated layer 18. Therefore, it is possible to obtain an anchor effect.

Thus, since it is not necessary to etch an ABS resin to form multiple fine irregularities on the fiber-reinforced member 17, it is possible to use the resin 21 which satisfies the strength and the heat resistance required for the fiber-reinforced member 17.

That is to say, it is possible to sufficiently secure the adhesiveness between the fiber-reinforced member 17 and the electroless-plated layer 18 along with the strength and the heat resistance of the fiber-reinforced member 17 are sufficiently secured.

In the first embodiment, as an example of the plated fiber-reinforced member 10, the impeller used for a rotary machine has been described as an example. However, as another example of the plated fiber-reinforced member 10, for example, resin parts for an automobile, resin parts for an aircraft, and the like can be exemplified.

Also, the method of the first embodiment may be provided with a step of forming a ceramic layer on the plated fiber-reinforced member 10 illustrated in FIG. 9 so as to cover the surface 18a of the electroless-plated layer 18.

Figure 10:
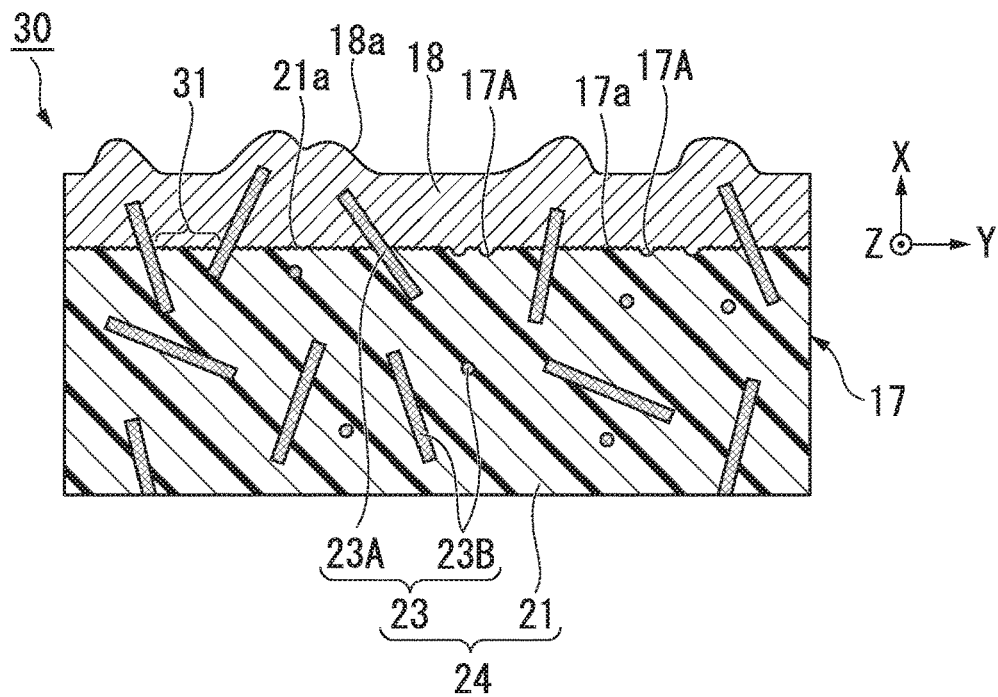
FIG. 10 is an enlarged cross-sectional view of a portion of the plated fiber-reinforced member according to a second embodiment of the present invention.

FIG. 10 is an enlarged cross-sectional view of a portion of a plated fiber-reinforced member according to a second embodiment of the present invention. In FIG. 10, constituent elements that are the same as those of the structure illustrated in FIGS. 1 to 3 will be denoted by the same reference numerals.

Referring to FIG. 10, a plated fiber-reinforced member 30 according to the second embodiment has the same constitution as the plated fiber-reinforced member 10 except that the surface 21a of the resin 21 constituting the plated fiber-reinforced member 10 according to the first embodiment has multiple fine irregularities 31 in addition to the multiple recessed portions 17A. An electroless-plated layer 18 is formed on the fine irregularities.

According to the plated fiber-reinforced member 30 in the second embodiment, it is possible to improve the anchor effect between the resin 21 and the electroless-plated layer 18, because the surface 21a of the resin 21 includes the multiple fine irregularities 31 having the electroless-plated layer 18 formed thereon in addition to the multiple recessed portions 17A.

The plated fiber-reinforced member 30 according to the second embodiment can accomplish the same effect as the plated fiber-reinforced member 10 according to the first embodiment.

Figure 11:
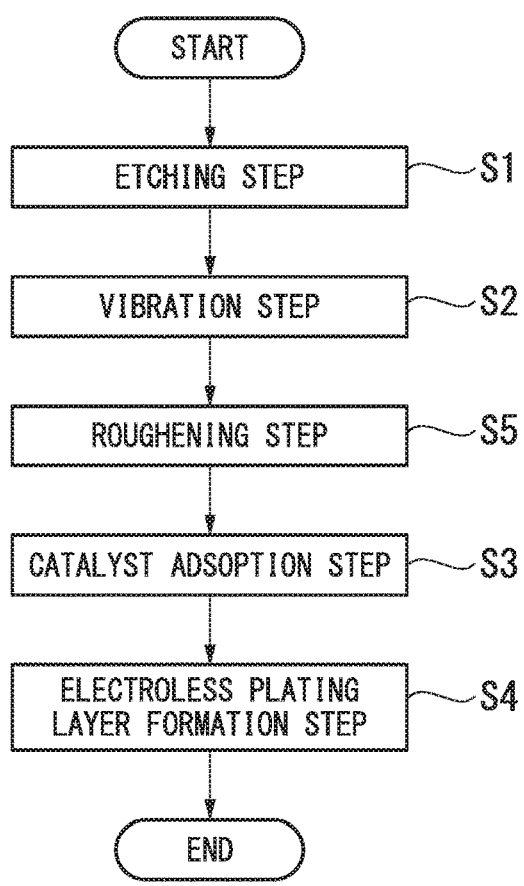
FIG. 11 is a flowchart for explaining a plating pretreatment and a plating treatment for the plated fiber-reinforced member in the second embodiment.

FIG. 11 is a flowchart for explaining a plating pre-treatment and a plating treatment for the plated fiber-reinforced member in the second embodiment. In FIG. 11, steps that are the same as those of the flowchart illustrated in FIG. 4 described above will be indicated by the same reference numerals.

Figure 12:
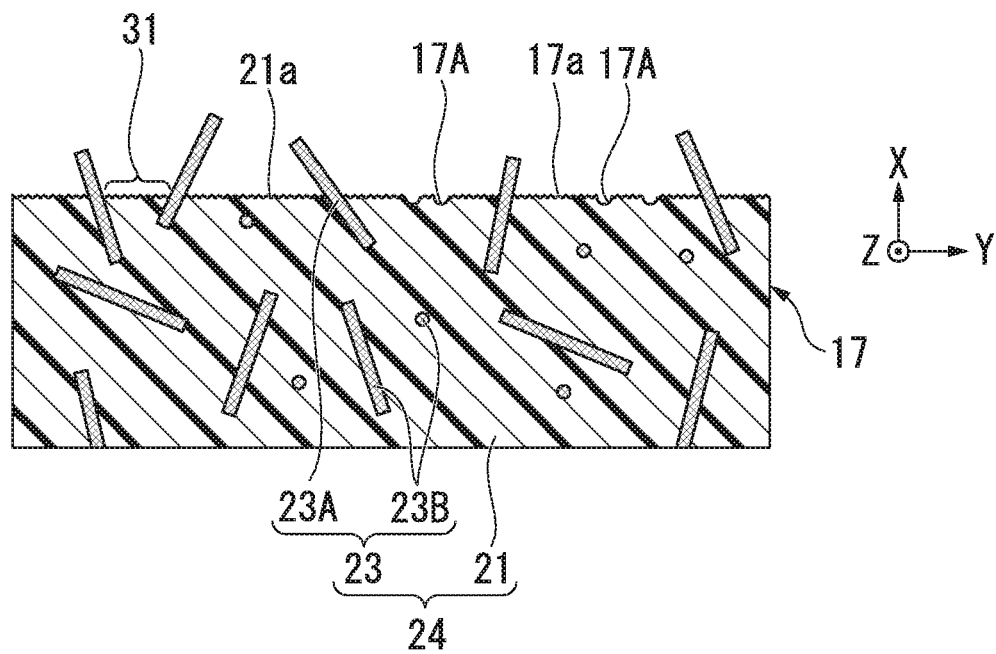
FIG. 12 is an enlarged cross-sectional view of a surface portion of the fiber-reinforced member after an etching step, a vibration step, and a roughening step.

FIG. 12 is an enlarged cross-sectional view of a surface portion of the fiber-reinforced member after an etching step, a vibration step, and a roughening step. In FIG. 12, constituent elements that are the same as those of the structure illustrated in FIG. 10 will be denoted by the same reference numerals.

A plating method (including plating pre-treatment) for the plated fiber-reinforced member 30 according to the second embodiment will be described below with reference mainly to FIGS. 11 and 12.

Before the process of FIG. 11 is started, the fiber-reinforced member 17 illustrated in FIG. 5 is prepared through a known method.

Subsequently, when the process illustrated in FIG. 11 is started, in S1, the etching step described above with reference to FIGS. 4, 6, and 7 is performed.

Subsequently, in S2, the vibration step described above with reference to FIGS. 4 and 7 is performed. It should be noted that the etching step and the vibration step may be performed at the same time also in the second embodiment.

Subsequently, in S5, the surface 21a of the resin 21 is roughened (roughening step) before a catalyst adsorption step (S3).

Thus, as illustrated in FIG. 12, the multiple fine irregularities 31 are formed in the surface 21a of the resin 21 having the multiple recessed portions 17A formed therein. Examples of a method for roughening the surface 21a of the resin 21 include a blast treatment.

Irregularities can be formed in portions of the reinforcing fibers 23A having a large exposure extent through an etching process, but it is difficult to form irregularities in portions thereof having a small exposure extent through an etching process.

However, since the above-described roughening step (for example, blast treatment) is performed, it is possible to form the multiple fine irregularities 31 even in portions of the reinforcing fibers 23A having a small exposure extent.

That is to say, since the roughening step is provided, it is possible to form the multiple fine irregularities 31 even in portions of the reinforcing fibers 23A having a small exposure extent. Thus, it is possible to improve the above-described anchor effect.

It is desirable that a surface roughness Ra of the resin 21 after the roughening step be, for example, 3 μm (maximum height Ry is 12.5 μm) or more and 8 μm (maximum height Ry is 32 μm) or less.

If the surface roughness Ra of the resin after the roughening step is less than 3 μm (maximum height Ry is 12.5 μm), there is a concern concerning the deterioration of the adhesiveness between the surface 21a of the resin 21 and the electroless-plated layer 18.

On the other hand, if the surface roughness Ra of the resin 21 after the roughening step exceeds 8 μm (maximum height Ry is 32 μm), there is a concern concerning the difficulty of the management of the thickness of the electroless-plated layer 18 due to the too large shape of the multiple fine irregularities 31 formed in the surface 21a of the resin 21.

Therefore, since the surface roughness Ra of the resin is set within a range of 3 μm (maximum height Ry is 12.5 μm) or more and 8 μm (maximum height Ry is 32 μm) or less, it is possible to sufficiently secure the adhesiveness between the resin 21 and the electroless-plated layer 18 in a state in which the thickness of the electroless-plated layer 18 is easily managed.

Subsequently, in S3, in FIGS. 4 and 8, the above-described catalyst adsorption step is performed. At that time, the catalysts 26 illustrated in FIG. 8 are also adsorbed on the multiple fine irregularities 31 illustrated in FIG. 12.

Subsequently, in S4, in FIGS. 4 and 9, the above-described electroless-plated layer formation step is performed. Thus, the plated fiber-reinforced member 30 according to the second embodiment illustrated in FIG. 10 is manufactured and the process illustrated in FIG. 11 is completed.

According to the plating method for the fiber-reinforced member in the second embodiment, it is possible to further improve the adhesiveness between the resin 21 and the electroless-plated layer 18 by providing the roughening step.

It should be noted that the plating method for the fiber-reinforced member according to the second embodiment can obtain the same effect as the plating method for the fiber-reinforced member according to the first embodiment.

It should be noted that a case in which the roughening step is performed after the etching step and before the catalyst adsorption step has been exemplified as an example in the second embodiment, but the roughening step may be performed before the etching step.

While the preferred embodiments of the present invention have been described in detail above, the present invention is not limited to this specific embodiments. In addition, various modifications and changes are possible without departing from the gist of the present invention described in the claims.

An experimental example will be described below, but the present invention is not limited to the following experimental example.

In the experimental example, a surface roughness Ra of a polyamide resin reinforced with a carbon fiber when a roughening process is performed on surfaces of a plate member including a polyamide resin reinforced with a carbon fiber and an impeller including the polyamide resin reinforced with a carbon fiber using the plate member and the impeller using a blast apparatus (model number; automatic rotation table type: ATCM) manufactured by Fuji Manufacturing Co., Ltd. and the presence or absence of peeling were investigated. Hereinafter, a polyamide resin reinforced with a carbon fiber will be simply referred to as a resin.

In the roughening step of the plate member, average particle diameters of an abrasive material were 49 μm, 69 μm, and 98 μm.

In the roughening step of the impeller, average particle diameters of an abrasive material were 116 μm, 165 μm, 231 μm, and 328 μm.

As blast conditions, an injection pressure of an abrasive material was set to 0.3 to 0.4 MPa and a blast time was 5 to 20 sec.

FORM TALYSURF (S4C-series 2) which is a surface roughness measurement apparatus manufactured by Taylor Hobson was used for the measurement of a surface roughness Ra.

Figure 13:
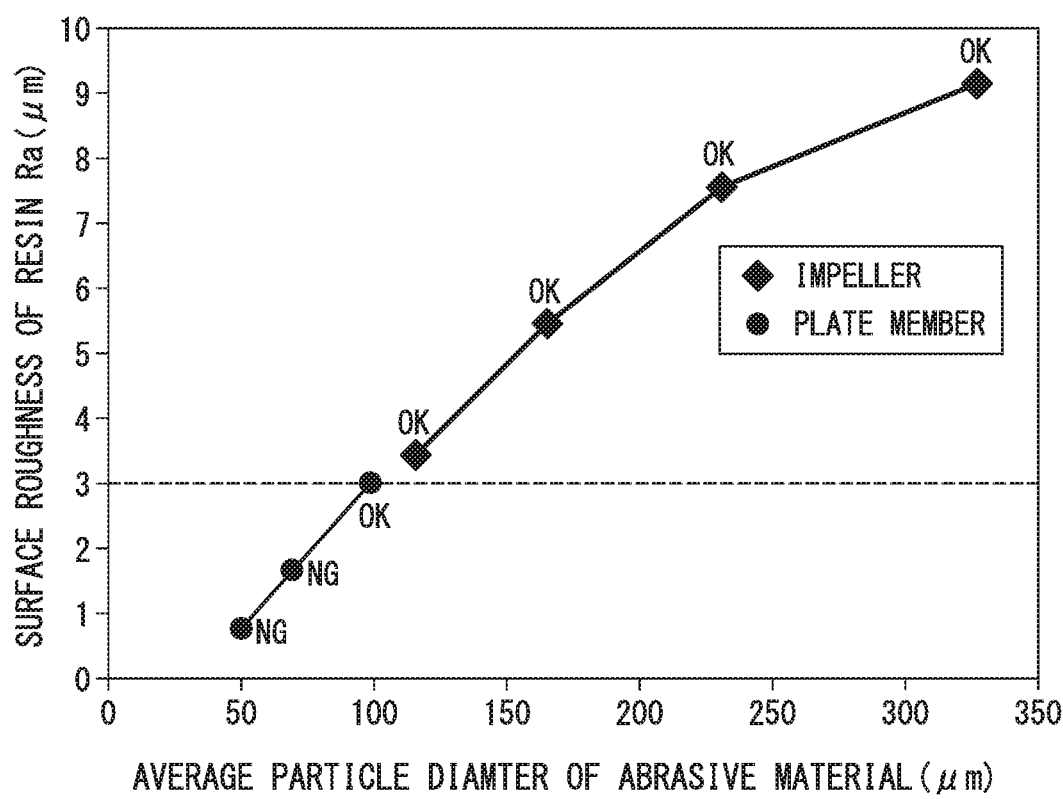
FIG. 13 is a graph for describing an experimental example illustrating a relationship between an average particle diameter of an abrasive material, a surface roughness Ra of a resin, and the presence or absence of peeling.

This result is illustrated in FIG. 13.

FIG. 13 is a graph for describing an experimental example illustrating a relationship between an average particle diameter of an abrasive material, a surface roughness Ra of a resin, and the presence or absence of peeling. OK illustrated in FIG. 13 indicates the result that there is no peeling and NG indicates the result that peeling is confirmed.

Referring to FIG. 13, it was confirmed that a surface roughness Ra of 3 µm or more was required from the result of the presence or absence of peeling of the plate member.

Also, it was confirmed that there was no peeling when a surface roughness Ra was within a range of 3.2 to 9.0 µm from the result of the impeller.

INDUSTRIAL APPLICABILITY

The present invention is applicable to a plated fiber-reinforced member having a plated layer formed on a surface of a fiber-reinforced member and a plating method for a fiber-reinforced member.

REFERENCE SIGNS LIST 10, 30 Plated Fiber-reinforced member
11 Disk
11a Upper surface
13 Blade
15 Flow path
17 Fiber-reinforced member
17a, 21a Surface
17A Recessed portion
18 Electroless-plated layer
21 Resin
23, 23A, 23B, 23C Reinforcing fiber
24 Composite fiber material
26 Catalyst
31 Fine irregularity
P Rotating shaft
W Coolant

The invention claimed is:

1. A plating method for a fiber-reinforced member comprising:
   an etching step of etching a surface of the fiber-reinforced member formed of a composite fiber material in which multiple reinforcing fibers are dispersed in a resin using an etching solution to selectively-dissolve the resin, thereby exposing portions of some of the multiple reinforcing fibers from a surface of the resin;
   a vibration step of vibrating the fiber-reinforced member, thereby removing the reinforcing fibers fully exposed from the etched resin from the resin;
   a catalyst adsorption step of adsorbing catalysts on the surface of the resin on which multiple recessed portions are formed and the portions of some of the reinforcing fibers from the surface of the resin, wherein the multiple recessed portions are formed by the removal of the reinforcing fibers through the etching step and the vibration step; and
   an electroless-plated layer formation step of forming an electroless-plated layer on the surface of the fiber-reinforced member using the catalysts as nuclei through an electroless plating method after the catalyst adsorption step.

2. The plating method for a fiber-reinforced member according to claim 1, wherein the etching step and the vibration step are performed at the same time.

3. The plating method for a fiber-reinforced member according to claim 1, further comprising
   a roughening step of roughening the surface of the resin prior to the catalyst adsorption step, wherein the roughening step is performed before or after the etching step.

4. The plating method for a fiber-reinforced member according to claim 3, wherein a surface roughness Ra of the resin after the roughening step is 3 µm or more and 8 µm or less.

* * * * *